(12) United States Patent
Plant et al.

(10) Patent No.: US 10,957,212 B2
(45) Date of Patent: Mar. 23, 2021

(54) COGNITIVE ESSAY ANNOTATION (71) Applicant: INTERNATIONAL BUSINESS MACHINES CORPORATION, Armonk, NY (US)

(72) Inventors: Laurence Plant, North Balwyn (AU); James D. Cleaver, Grose Wold (AU); Stefan Harrer, Hampton (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 304 days.

(21) Appl. No.: 15/945,500

(22) Filed: Apr. 4, 2018

(65) Prior Publication Data
US 2019/0311641 A1   Oct. 10, 2019

(51) Int. Cl.
*G06N 3/08* (2006.01)
*G09B 5/08* (2006.01)

(52) U.S. Cl.
CPC .............. *G09B 5/08* (2013.01); *G06N 3/08* (2013.01)

(58) Field of Classification Search
CPC .................................. G09B 5/08; G06N 3/08
USPC ........................................................ 434/353
See application file for complete search history.

(56) References Cited

U.S. PATENT DOCUMENTS

| 8,467,716 B2 | 6/2013 | Burstein et al. |
| 2015/0199913 A1 | 7/2015 | Mayfield et al. |
| 2015/0339939 A1 | 11/2015 | Gustafson et al. |
| 2017/0140659 A1 | 5/2017 | Alsanie et al. |

OTHER PUBLICATIONS

Liu, M., et al., "Automated essay feedback generation and its impact in the revision", IEEE Transactions on Learning Technologies, vol. 10, No. 4, Oct.-Dec. 2017.
Hughes, S., et al., "Machine learning for holistic evaluation of scientific essays", <http://cite.seerx.ist.psu.edu/viewdoc/download;jsessionid=B7B657534F15FF0F5346201CE461EBB2?doi=10.1.1.698.4495&rep=rep1&type=pdf>, Jun. 2015.
P. Mell, et al. *"The NIST Definition of Cloud Computing"*, NIST Special Publication 800-145, Sep. 2011, Gaithersburg, MD.

*Primary Examiner* — Robert P Bullington
(74) *Attorney, Agent, or Firm* — Aaron Pontikos, Esq.; Hye Jin Lucy Song, Esq.; Heslin Rothenberg Farley & Mesiti P.C.

(57) ABSTRACT

Methods, computer program products, and systems are presented. The methods include, for instance: obtaining sample essays, sample annotations corresponding to the sample essays, and a subject content for building a subject domain comprehension model and an essay annotation model, by use of one or more neural network. The nodes of the subject domain comprehension model and the essay annotation model are interconnected based on respective relevancies for automatically annotating student works according to a standard of review corresponding to submitting students.

20 Claims, 7 Drawing Sheets

COGNITIVE ESSAY ANNOTATION

TECHNICAL FIELD

The present disclosure relates to cognitive machine learning technology, and more particularly to methods, computer program products, and systems for modeling for and performing of, annotation on academic essays as trained by neural networks.

BACKGROUND

In conventional school environments, essays written by students are reviewed and evaluated by individual teachers who teach respective subjects. Varying aspects during the review process of the essays may include, but are not limited to, respective experiences and/or qualities of the individual teachers, knowledge of the individual teachers on respective subjects and/or topics of the essays, and respective standards of review for the essays, as being applied by the individual teachers.

SUMMARY

The shortcomings of the prior art are overcome, and additional advantages are provided, through the provision, in one aspect, of a method. The method for providing automated annotation for one or more student work includes, for instance: obtaining, by one or more processor running one or more neural network, a plurality of sample essays, a plurality of sample annotations for corresponding sample essays, and a subject content; labeling, by the one or more processor running the one or more neural network, the sample essays for gradable components and the sample annotations for respective annotation types; building, by the one or more processor running the one or more neural network, a subject domain comprehension model based on the subject content, by use of the one or more neural network; forming, by the one or more processor running the one or more neural network, an essay annotation model, based on the labeled sample essays and the labeled sample annotations; linking, by the one or more processor running the one or more neural network, nodes of the subject domain comprehension model and nodes of the essay annotation model, based on respective relevancies; and producing, by the one or more processor, interconnected models resulting from the linking based on determining that the one or more neural network has been trained for automatically annotating the one or more student works, including an essay, according to a standard of review corresponding to submitting students.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
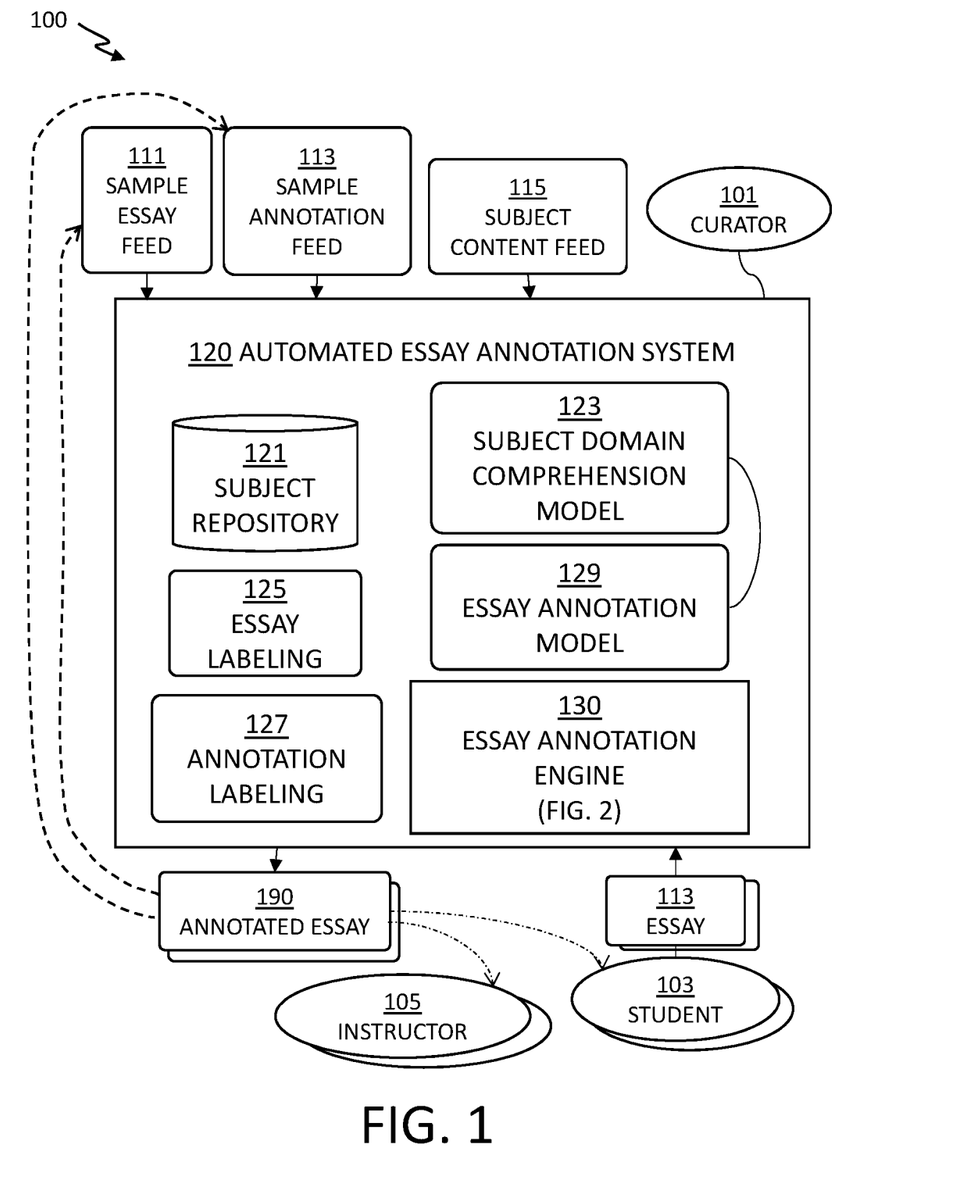
FIG. 1 depicts a system 100 for cognitive essay annotation, in accordance with one or more embodiments set forth herein.

FIG. 1 depicts a system 100 for cognitive essay annotation, in accordance with one or more embodiments set forth herein.

Embodiments presented herein recognizes that, in conventional school environments, essays written by students are reviewed and evaluated by individual teachers who teach respective subjects. Various aspects affecting the review process of the essays may include, but are not limited to, respective experiences and/or qualities of the individual teachers, respective subjects and/or topics of the essays, and respective standards of review applied for the essays. Also, the teachers often do not have enough time to provide one-on-one review feedback in detail to the students, which is critical in development of the essay writing skill for the students.

The same embodiments herein also recognizes that, even when teachers are available, the varying aspects noted above with respect to individualities of each teacher, such as individual levels of knowledge on the respective subjects, standards of review applied for the essays, and the way feedbacks are provided to the students, may be inconsistent and not conducive to improvement of essay writing skills on the students.

The system 100 for cognitive essay annotation is an educational tool that automatically reviews the essays and cognitively provides instructive annotations based on natural language processing, subject/topic modeling, and essay annotation modeling. Accordingly, the system 100 may provide detailed instructive feedbacks consistently to the students and/or other teachers on the essays per subjects/topics, student cohorts based on academic development levels represented in school-year grades and/or academic performance of respective students. By receiving comprehensive instructive feedback on the essays written by themselves, the students may benefit greatly in improving essay writing skills as well as in gaining knowledge on the subject/topic dealt in the essays. From an educational administrative perspective, the system 100 may provide be utilized in providing quality education by supplementing a shortage in qualified teachers, temporary or otherwise, by reducing workloads for the teachers, by enhancing knowledgebase on the subject/topic, by unifying the standard of essay review appropriate for academic development levels school-year grades and/or academic performance of certain student groups, and by facilitating communication and training on essay review and annotations amongst teachers.

The system 100 for cognitive essay annotation includes an automated essay annotation system 120, which implements functionalities of computational linguistics (CL), natural language processing (NLP), and natural language generation (NLG), by use of machine learning with neural networks. The automated essay annotation system 120 learns how to annotate essays by use of automated modeling utilizing machine learning with artificial neural network(s) from training data. The training data includes, but are not limited to, a sample essay feed 111, a sample annotation feed 113, and a subject content feed 115. The sample essay feed 111 inputs essays written by students in the past to the automated essay annotation stem 120. The sample annotation feed 113 inputs instructive review annotations as provided by teachers for sample essays from the sample essay feed 111. Types of the texts and/or marks included in the annotations may be, for example, in-line editorial markings for corrections, suggestions, compliments, or other insights offered as text notes on the margins and/or designated review section, grade letters or alphanumeric grades.

The subject content feed 115 includes respective knowledgebases per subjects/topics on which the sample essays from the sample essay feed 111 had been written. In certain embodiments of the present invention, the subject content feed 115 may also include other subject knowledgebases than the respective topics dealt in the sample essay feed 111, such that essays on such other subjects may also be annotated based on cognitive models as described below.

The automated essay annotation system 120, in a training stage, performs an essay labeling process 125 and an annotation labeling process 127, and builds a subject repository 121, a subject domain comprehension model 123, and an essay annotation model 129. A curator 101 controls and configures various aspects in training of the automated essay annotation system 120. The subject domain comprehension model 123 includes elements of the essay demonstrating the understanding of the subject by the students, including, but not limited to, statement of facts, including chronological presentation of historical events, known reviews and analyses, arguments based on the facts from the subject repository 121 as being relevant to the subject, the structure of the arguments and logical progression, aspects of essay review standard, including readability, vocabulary, usage of examples, etc.

The automated essay annotation system 120 includes an essay annotation engine 130. In an operating stage, the essay annotation engine 130 obtains one or more essay 113 from respective student 103 and generates an annotated essay 190 corresponding to the essay 113 input from the student 103, based on the subject models in the subject repository 121, the subject domain comprehension model 123, and the essay annotation model 129 generated during the latest training stage. At the conclusion of the training, the essay annotation engine 130 connects nodes of the subject domain comprehension model 123 and the essay annotation model 129, where respective relevancies and/or dependencies are discovered between two nodes across two models 123, 129. The automated essay annotation system 120 subsequently delivers the annotated essay 190 to the student 103 and one or more instructor 105 who is designated as a recipient of the annotated essay 190 by the curator 101. The one or more instructor 105 may be a teacher who gave an assignment to the student 105 to submit the essay 113, and/or another teacher who is in training for essay review and annotation. The annotated essay 190 may be configured to be included in the sample essay feed 111 and the sample annotation feed 113, for a next training stage. In this specification, terms "teacher" and "instructor" are used interchangeably. Details on the operations of the essay annotation engine 130 are presented in FIG. 2 and corresponding description.

The essay annotation engine 130 of the automated essay annotation system 120 operates by use of selected forms of artificial neural network for deep learning such as deep feedforward (DFF) neural networks, deep belief networks (DBN), deep convolutional network (DCN), and recurrent neural networks (RNN). Such artificial neural network may be a custom-programmed component of the essay annotation engine 130, or a tool available for subscription, that is external to the automated essay annotation system 120. In the training stage, the selected artificial neural network of the essay annotation system 120 processes unstructured inputs of the sample essay feed 111, the sample annotation feed 113, and the subject content feed 115 by parsing and labeling, via the essay labeling process 125 and the annotation labeling process 127. As a result, the automated essay annotation system 120 generates the subject domain comprehension model 123 and the essay annotation model 129.

Figure 2:
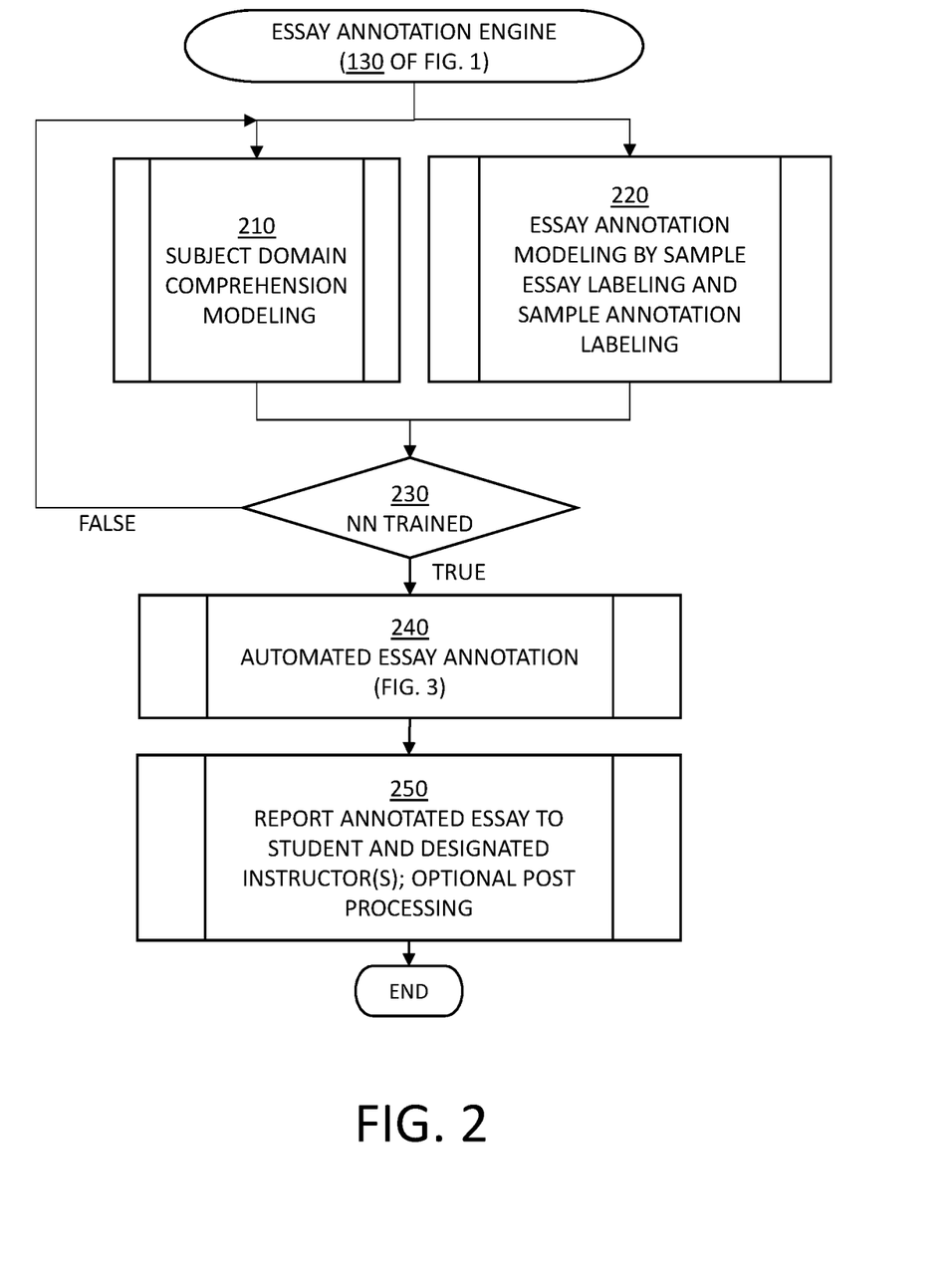
FIG. 2 depicts a flowchart of operations performed by the essay annotation engine of FIG. 1, in accordance with one or more embodiments set forth herein.

FIG. 2 depicts a flowchart of operations performed by the essay annotation engine 130 of FIG. 1, in accordance with one or more embodiments set forth herein.

The essay annotation engine 130, specifying a program component of the automated essay annotation system 120 includes a machine learning process that employs Natural Language Understanding and Deep Learning, by use of artificial neural networks of choice. Certain embodiments of the present invention recognizes that presently available natural language tools of various functionalities may be utilized for the essay annotation engine 130. Certain embodiments of the present invention may utilize a proprietary natural language tools, in order to offer specifically oriented labeling and classification functionalities for input feeds 111, 113, 115, such that the neural network modeling may be able to identify patterns distinctive in the operations of the essay annotation engine 130. Blocks 210 through 230 may be grouped as a Training Phase of the essay annotation engine 130, and blocks 210 and 220 may be performed concurrently in case where there are no dependencies in respective inputs. Blocks 240 and 250 may be grouped as an Operation Phase of the essay annotation engine 130.

In block 210, the essay annotation engine 130 builds the subject domain comprehension model 123, based on inputs from the subject content feed 115 and the knowledgebase in stored in the subject repository 121. The curator 101 may preconfigure various aspects including types, sources, authors, relevancies, and as such of respective subject content material per subject to direct training of the essay annotation engine 130. As a result, the subject domain comprehension model 123 may include various reference materials that may appear in the essay 113 for a certain grade of students, in association with respective subjects of the essay 113. For example, provided the essay 113 is supposed to be on a certain novel, the subject domain comprehension model 123 may include, but are not limited to, a student cohort in school-year grades, and/or other academic performance levels, to whom the novel may be appropriately assigned, the author's biography and style, genre description, historical background of the period, social/personal events affecting the creation of the novel, and known interpretations, reviews, and analyses of the novel/the author, as corresponding to the name of the novel and/or the name of the author, in a graphical model with individual nodes for respective elements linked to relevant nodes with respectively weighted edges/links. Then the essay annotation engine 130 proceeds with block 230.

In certain embodiments of the present invention, students who wrote the sample essays in the sample essay feed 111 are pre-registered and profiled for applicable grades and/or other classification applicable for student cohort determinations. The curator 101 may configure longitudinal student cohorts based on the student information and the sample essay feed 111, and the essay annotation engine 130 may develop corresponding scales between the respective student cohort and certain qualities and contents expected from the essays written by a writer from the student cohort, such that the essays in the sample essay feed 111 may be properly modeled for appropriate student cohort during the Operation Phase. The essay annotation engine 130 may differentiate standards of review for respective student cohorts corresponding to distinctive academic performance levels and/or grades, such that each student work would be reviewed and annotated by the corresponding standard. For example, even the subject/topic of an assignment is identical, the essay annotation engine 130 reviews and annotates essays submitted by 12-th grade students more critically than essays submitted by 9-th grade students, by applying a standard for 12-th grade student cohort.

In block 220, the essay annotation engine 130 builds the essay annotation model 129 by parsing and labeling the sample essay feed 111 and the sample annotation feed 113, respectively. The curator 101 may preconfigure various gradable components of sample essays to be labeled, including, but not limited to, structures for the essay/paragraphs/sentences, relevant facts, presented arguments and assessment thereof, including, logical flow and clarity of the arguments, evidentiary supports for/against the arguments, persuasiveness/clarity in expression for the arguments, general readability/originality of the essay, mechanics of writing such as grammar, spelling, word choices, as often used in ordinary essay evaluations. Similarly, the curator 101 may preconfigure various annotation types as discovered in the sample annotations for labeling, including, but not limited to, corrections in texts and editorial marks, suggestions/recommendations for activities, references, and/or techniques, compliments, grade letters, etc. The essay annotation engine 130 may discover other aspects and patterns from the sample essay feed 111 and the sample annotation feed 113, if and how certain aspects of the sample essays had been commented by human instructors in the sample annotation feed 113. For example, if a sample essay had been marked with a comment stating "Excellent flow! I enjoyed reading your piece very much", then the essay annotation engine 130 would classify the structure and/or the readability of the sample essay as a high weight, indicating that a structure similar to the sample essay may also be annotated with a comparable compliment, by linking the respective nodes for the structure and the compliment and weighting the link with a high score. Accordingly, the resulting essay annotation model 129 is a graphical model of the aforementioned types of annotations, respective classification labels and instances, and, optionally, respective significances corresponding to the annotation nodes. Then the essay annotation engine 130 proceeds with block 230.

In certain embodiments of the present invention, the essay annotation engine 130 may build the essay annotation model according to respective student cohorts in school-year grades, and/or a preconfigured classification of student performance. For example, a student cohort may be a "12-th grader", a "12-th grader: Average B", or a "9-11th grader: 93 percentile". For each student cohort, the essay annotation engine 130 builds respective exemplary essay model, by forming a template, or a shell, for the essays submitted by students in a current student cohort, based on structures of the sample essays from the sample essay feed 111. The essay annotation engine 130 builds a graphical model of essay content based on the built template, by linking individually labeled nodes for respective writing elements to the template where instances of each writing element appears in the sample essay. If a certain content addresses a fact, then the content of the essay may be compared with corresponding data elements from the subject repository 121, to evaluate whether or not the content has been truthfully presented. Conversely to the student cohort across school-year grades/performance levels, the essay annotation engine 130 may build a writing skill development model for individual students and accumulate essays and annotations over time to track the progress shown by each student.

In block 230, the essay annotation engine 130 determines whether or not the neural network of the essay annotation engine 130 has been trained enough for the Operation Phase, in which the essay annotation engine 130 practices annotating the essay 113. If the essay annotation engine 130 determines that the neural network is ready, then the essay annotation engine 130 produces the trained models 123, 129 as an interconnected model and proceeds with block 240. If essay annotation engine 130 determines that the neural network is not ready, then the essay annotation engine 130 loops back to blocks 210 and 220 in order to continue with the Training Phase and continue with building the subject domain comprehension model 123 and the essay annotation model 129.

The test of block 230 is to determine if the neural network is ready for the Operation Phase, in which the essay annotation engine 130 would provide instructions and comments to improve essay writing skills for the student 103 on the essay 113 submitted, by producing the annotated essay 190, as well as discussion and applicable points for the instructor 105 to improve the quality of annotations provided in the future and to have a more coherent standard of review for the essay 113. Prior to test the models 123, 129 for the Operation Phase, the essay annotation engine 130 interconnects nodes from respective graphical models representing the subject domain comprehension model 123 resulting from block 210 and the essay annotation model 129 resulting from block 220, in accordance with their respective relevancies and/or dependencies, as such respective patterns of relevancy and/or dependency are discovered by the selected neural network. Depending on the level of relevancy and/or dependency, edges and/or arcs linking the respective nodes may be assigned with respective weights, according to aspects configured for the essay annotation engine 130. An example of a connected model combining the subject domain comprehension model 123 and the essay annotation model 129 is presented in FIG. 4 and corresponding description.

In certain embodiments of the present invention, the essay annotation engine 130 determines if the neural network is ready for the Operation Phase, based on various aspects of essay annotation. The essay annotation engine 130 may determine the readiness of the neural network by ascertaining how accurately the essay 113 is evaluated by the subject domain comprehension model 123. The essay evaluation performance may be determined based on, including, but not limited to, the number of nodes of the subject domain comprehension model 123 identified for the essay 113, and respective relevancies of the nodes to respective evaluation point of the essay 113.

The essay annotation engine 130 may determine the readiness of the neural network by further ascertaining how accurately the essay 113 is annotated by the essay annotation model 129. The essay annotation performance maybe determined based on, including, but not limited to, the number of nodes of the essay annotation model 129 connected from the identified nodes of the subject domain comprehension model 123, and respective relevancies/dependencies of the connections to ensure providing annotation corresponding to the essay 113.

The essay annotation engine 130 may have respective preconfigured thresholds for various performance measures of the connected models 123, 129, including, but not limited to, a number of subject domain comprehension nodes representing the essay 113 and weights for respective nodes indicating relative significances for respective elements of the essay 113 represented by the nodes. Each node of the subject domain comprehension model 123 indicates the element in the subject domain and how well respective students submitted the essays understand the element in the subject domain. The respective significances for the elements of the essay 113 as represented by the nodes indicate how the elements of the essay 113 affects to the evaluation of the level of understanding on the subject by the student 103.

The essay annotation engine 130 may have respective preconfigured performance thresholds for a number of essay annotation nodes representing annotations to be applied for the essay 113 in the annotated essay 190 and weights for respective nodes indicating relative significances for each elements of the annotation represented by the nodes. The essay annotation engine 130 may have a preconfigured threshold for a number of essay annotation nodes to identify, in order for the essay annotation engine 130 to be ready for the Operation Phase, such that the annotated essays 190 have a certain level of corrective markings, grade letters, and educational comments, collectively referred to as annotation, for the respective students.

In certain embodiments of the present invention, the essay annotation engine 130 determines if the neural network is ready for the Operation Phase, based on the level of interconnection between nodes of the subject domain comprehension model 123 and the essay annotation model 129, subsequent to forming an interconnected subject domain comprehension-essay annotation model. The essay annotation engine 130 may ascertain the level of interconnection between the two models 123, 129, by use of, including, but not limited to, a number of links between the nodes of the subject domain comprehension model 123 and the nodes of the essay annotation model 129, weights respective to each node indicating how two nodes from respective models 123, 129 are relevant and/or dependent. In order to indicate dependencies, the essay annotation engine 130 may utilize directional arrows, referred to as arcs, primarily in a direction from nodes of the subject domain comprehension model 123 and nodes of the essay annotation model 129, in order to reflect that content of the annotation would be provided according to the content of the essay 113.

In certain embodiments of the present invention, the essay annotation engine 130 determines if the neural network is ready for the Operation Phase, based on a confidence score for a test annotation. The essay annotation engine 130 may have a certain threshold confidence score preconfigured for essay annotations and assess the readiness of the connected models 123, 129 by performing the test annotation, and continue training the models 123, 129 until the test annotation reach the threshold confidence score.

The essay annotation engine 130 may independently use individual test elements, or combine the test elements in determining the readiness of the neural network, depending on the purposes of the test. For example, the essay annotation engine 130 may prepare the neural network distinctively for respective purposes including, but not limited to, essay annotation for students, annotation for instructors, grading for weekly assignments, grading for term papers. The essay annotation engine 130 may have preconfigured thresholds for confidence scores for elements in the essay annotation, indicating how accurately the annotations are given corresponding to the essays, as checked against the categories presented in the connected models 123, 129, such that the annotated essays 190 have a certain level of corrective markings, grade letters, educational comments on elements of the essay and on the essay as a whole, and recommendations for references and/or activities, collectively referred to as annotation, for the respective students.

In block 240, the essay annotation engine 130 obtains the essay 113 from the student 105 and annotates the essay 113 automatically by use of the subject domain comprehension model 123 and the essay annotation model 129, as being interconnected from block 230. Detailed operations of block 240 are presented in FIG. 3 and corresponding description. Then the essay annotation engine 130 proceeds with block 250.

In block 250, the essay annotation engine 130 reports the annotated essay 190 to the student 103 who submitted the essay 113, and/or the instructor 105, as designated by the curator 101. The instructor 105 may be a teacher who gave the assignment of writing the essay 113 to the student 103, and the essay annotation engine 130 may be utilized as a teaching aid to reduce workload of the teacher, and/or a preliminary review tool. Or, as noted, the annotated essay 190 may be used as a training tool for new teachers in skills for reviewing and annotating student works by example.

In certain embodiments of the present invention, the essay annotation engine 130 may further identify strengths and weaknesses of the essay 113, based on the student cohort to which the student 103 belong, as a group for the student cohort and/or as an individual for the student 103 in comparison to other members of the student cohort. According to the assessed strengths and weaknesses, the essay annotation engine 130 may include, in the annotated essay 190, recommendations for certain activities, references, and techniques to improve general quality of the essay 113.

In certain embodiments of the present invention, the essay annotation engine 130 may optionally adjust interconnected mappings between the subject domain comprehension model 123 and the essay annotation model 129, either automatically based on the quality of annotations as assessed against a preset performance threshold, or manually by the curator 101 according to feedback provided by the student 103 and/or the instructor 105.

In certain embodiments of the present invention, the essay annotation engine 130 may be applied to a debate script from a live debate, as being converted by speech-to-text tools in real time. The essay annotation engine 130 may apply the same standards of review for the student cohort performance level to the debate script, or a distinctive set of standards configured for a debate speech. According to the annotations on the debate script that is presented to the students participating in the live debate, the students and/or the instructor may utilize the annotations for advancing arguments spontaneously, and/or for a fact check as being discussed in the live debate.

Then the essay annotation engine 130 terminates processing the essay 113 that had been obtained in block 240. The essay annotation engine 130 may loop back to block 210 for further training, or to block 240 for annotating another essay, according to runtime configuration of the essay annotation engine 130.

Figure 3:
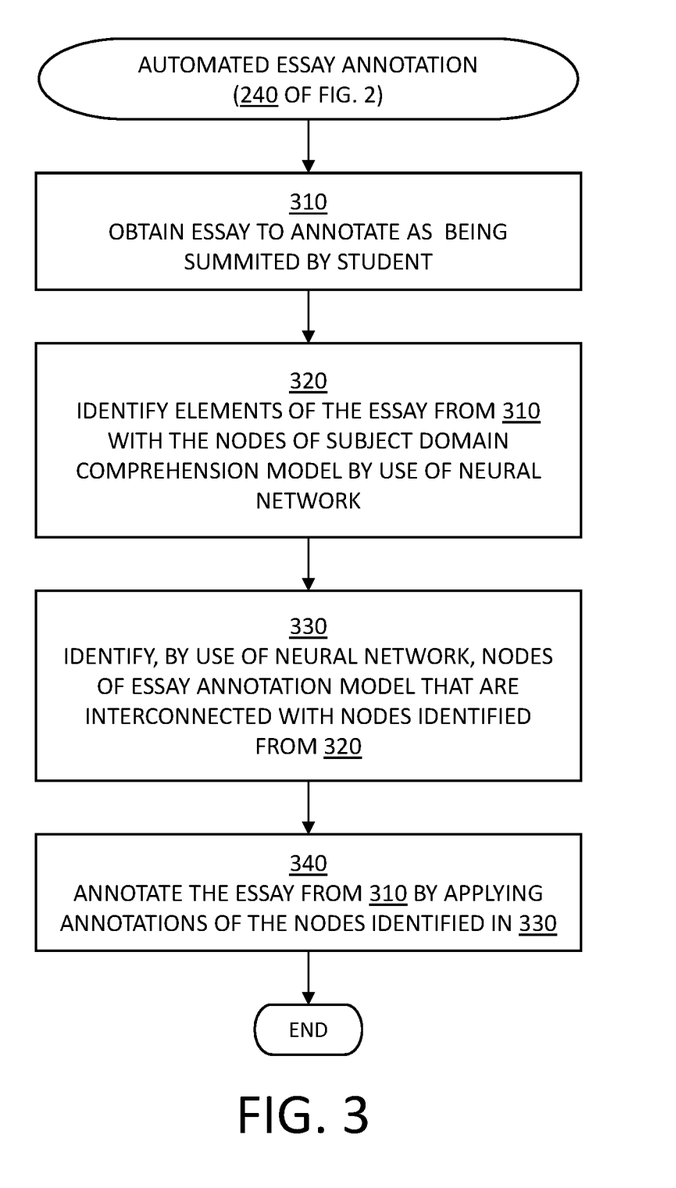
FIG. 3 depicts a flowchart of automated essay annotation process as performed in block 240 by the essay annotation engine, in accordance with one or more embodiments set forth herein.

FIG. 3 depicts a flowchart of automated essay annotation process as performed in block 240 of FIG. 2, by the essay annotation engine 130, in accordance with one or more embodiments set forth herein.

In block 310, the essay annotation engine 130 obtains the essay 113 summited by the student 103 for annotating. Then the essay annotation engine 130 proceeds with block 320.

In block 320, the essay annotation engine 130 identifies nodes from the subject domain comprehension model 123 that is applicable for the essay 113 obtained in block 310. The essay annotation engine 130 processes the essay 113 by the essay labeling process 125, or similar natural language processing tool to parse and to label the content of the essay 113 into elements of the essay 113, prior to identify the nodes from the subject domain comprehension model 123 that respectively correspond to the elements of the essay 113. Then the essay annotation engine 130 proceeds with block 330.

In block 330, the essay annotation engine 130, by use of the interconnected models 123, 129 from block 230 of FIG. 2, identifies nodes of the essay annotation model 129 that are respectively interconnected with the nodes in the subject domain comprehension model 123 that had been identified from block 320. The nodes identified in the essay annotation model 129 respectively correspond to the elements of the essay 113, via the nodes identified from block 320 in the subject domain comprehension model 123, such that the annotations may be provided for the elements of the essay 113, respectively or collectively. Then the essay annotation engine 130 proceeds with block 340.

In block 340, the essay annotation engine 130 annotates the essay 113 obtained from block 310 by applying annotations corresponding to the nodes of the essay annotation model 129, as having been identified in block 330. As noted, types of annotations applicable to the essay 113 may include, but are not limited to, corrections in texts and editorial marks, suggestions/recommendations for activities, references, and/or techniques, compliments, and grade letters. Then the essay annotation engine 130 proceeds with block 250 of FIG. 2.

Figure 4:
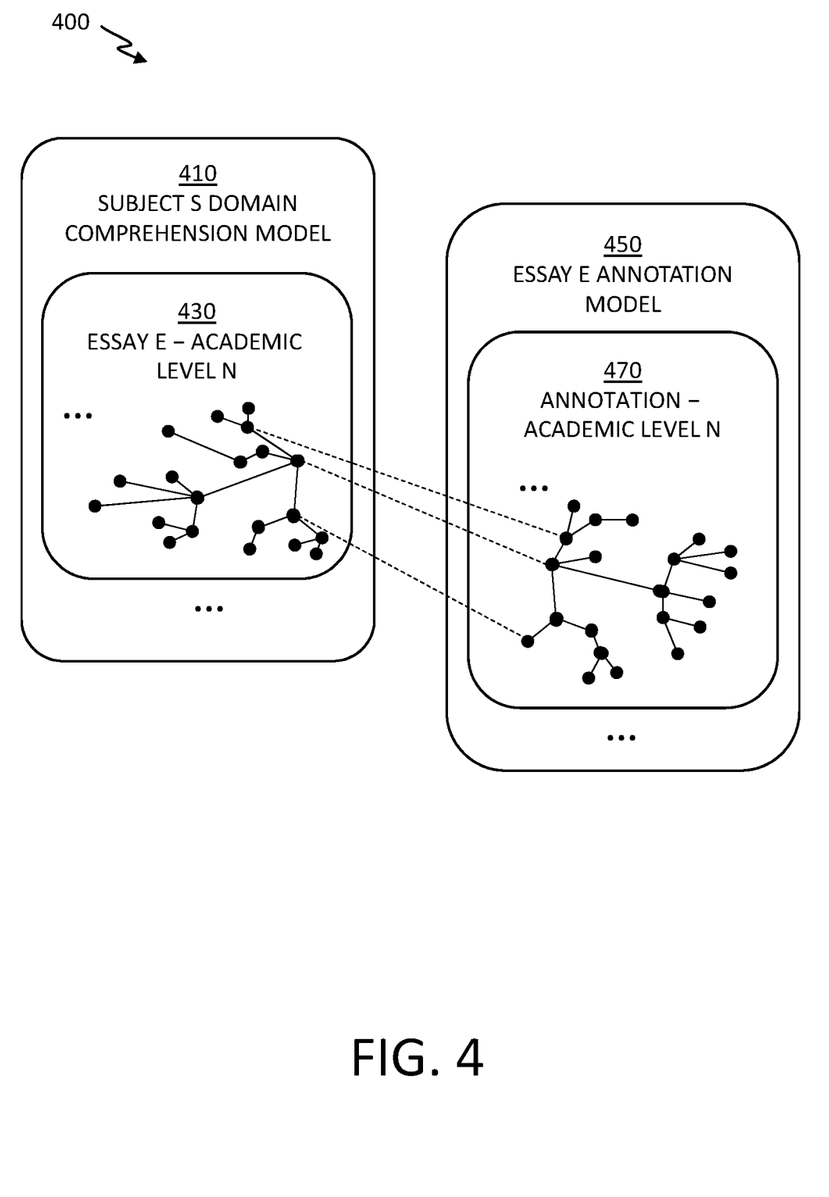
FIG. 4 depicts an exemplary depiction of an interconnected subject domain comprehension-essay annotation model as formed by the essay annotation engine, in accordance with one or more embodiments set forth herein.

FIG. 4 depicts an exemplary depiction of an interconnected subject domain comprehension-essay annotation model 400 as formed in block 230 of FIG. 2, in accordance with one or more embodiments set forth herein.

The exemplary interconnected subject domain comprehension-essay annotation model 400 includes Subject S Domain Comprehension Model 410 and Essay E Annotation Model 450. "Subject S" indicates any uniquely identifiable subject for which the essay 113 is submitted. Instances of "Subject S" may be, but are not limited to, English, Classical English, Modern English literature, Social studies, Biology, and, Science. Similarly, "Essay E" indicates a type of essay to which a distinctive level and/or content of annotations are applied. Instances of "Essay E" may be, but are not limited to, weekly assignment, mid-term paper, final-term paper, group project presentation, science fair description, and other special occasion essay.

The Subject S Domain Comprehension Model 410 includes Essay E-Academic Level N comprehension model 430, among many subject comprehension models corresponding to respective essay types and academic levels. "Academic Level N" indicates a level of academic achievement of the student 103, by which a distinctive set of measurements for the subject comprehension would be applied. Instances of "Academic Level N" may be, but are not limited to, 1-5 grade, 6-9 grade, 10-12 grade, 10-12 grade—Average A, 10-12 grade—Average B, 10-12 grade—Average C, 10-12 grade—Average below passing grade, and other academic levels for which a distinctive standard of review is desirable for assessing subject domain comprehension by the students.

The Essay E Annotation Model 450 includes Annotation-Academic Level N annotation model 470, of which nodes are linked from corresponding nodes in the Essay E-Academic Level N comprehension model 430 of the Subject S Domain Comprehension Model 410. The links/arcs indicate that the respective annotation nodes of the Annotation-Academic Level N annotation model 470 is applicable for annotating the essay 113 demonstrating the respective subject comprehension nodes of the Essay E-Academic Level N comprehension model 430, on the Subject S. Accordingly, the student 103 would receive annotations on the submitted essay 113 corresponding to the subject (Subject S), the type of essay (Essay E), according to a level of academic achievement of the student 103 (Academic Level N)

Certain embodiments of the present invention may offer various technical computing advantages, including the use of neural networks for processing and labeling training data including unstructured essays, annotations, and subject contents, in order to build an essay annotation model and a subject domain comprehension model, as being interconnected based on relevancies between respective nodes from two models. Certain embodiments of the present invention provides consistent review of student works and guidance to improve the student works according to an individual and/or group development level for a student, and consequently, reduces a great amount of workload of instructors in reviewing, grading, and commenting the student works. Certain embodiments of the present invention provides tools to take feedback on the automatically generated annotation in order to adjust the essay annotation model and the interconnected subject domain comprehension model. Further, a real-time annotation for a spoken presentation such as debate sessions may be provided by use of external speech-to-text conversion tools and the generated interconnected subject-annotation models. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The automated essay annotation service may be provided for subscribed entities, educational or otherwise, and individuals in need from any location in the world.

Figure 5:
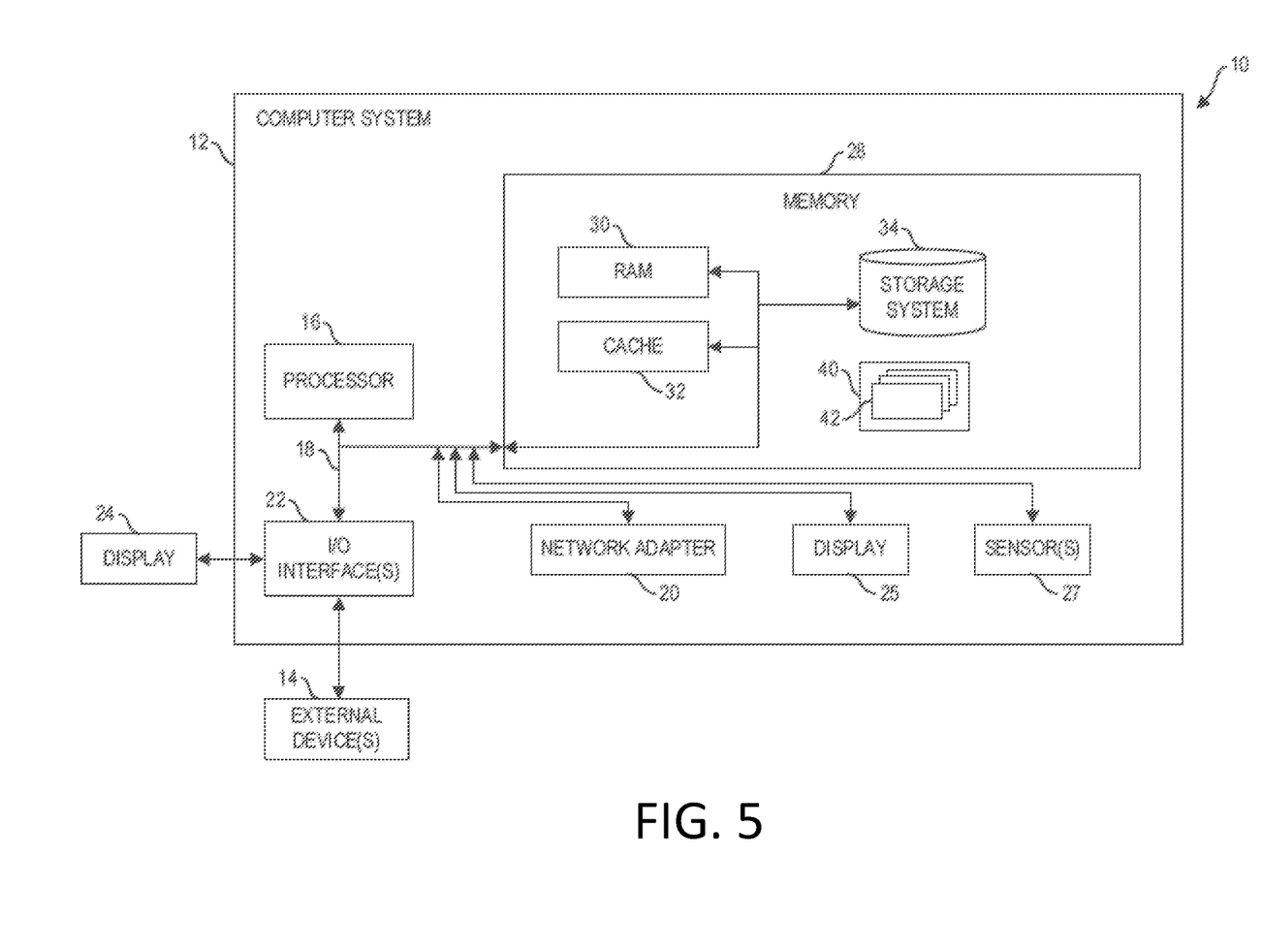
FIG. 5 depicts a cloud computing node according to an embodiment of the present invention.
Figure 6:
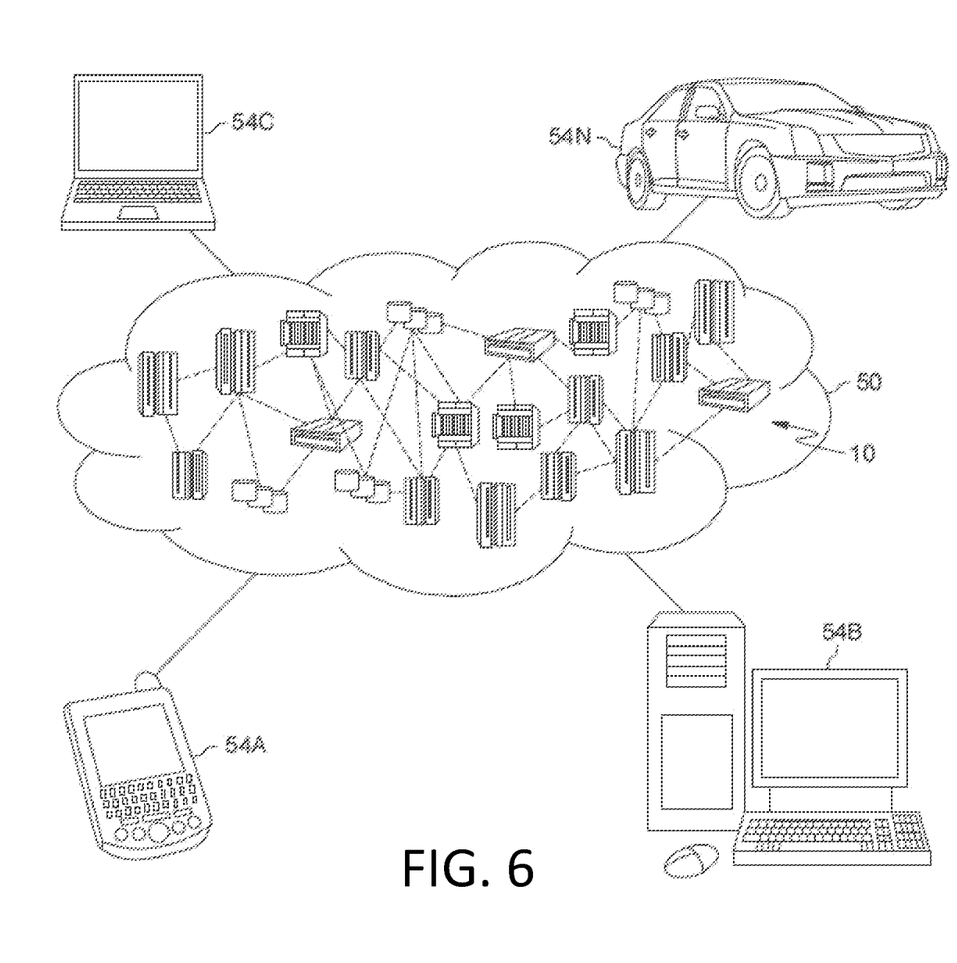
FIG. 6 depicts a cloud computing environment according to an embodiment of the present invention.
Figure 7:
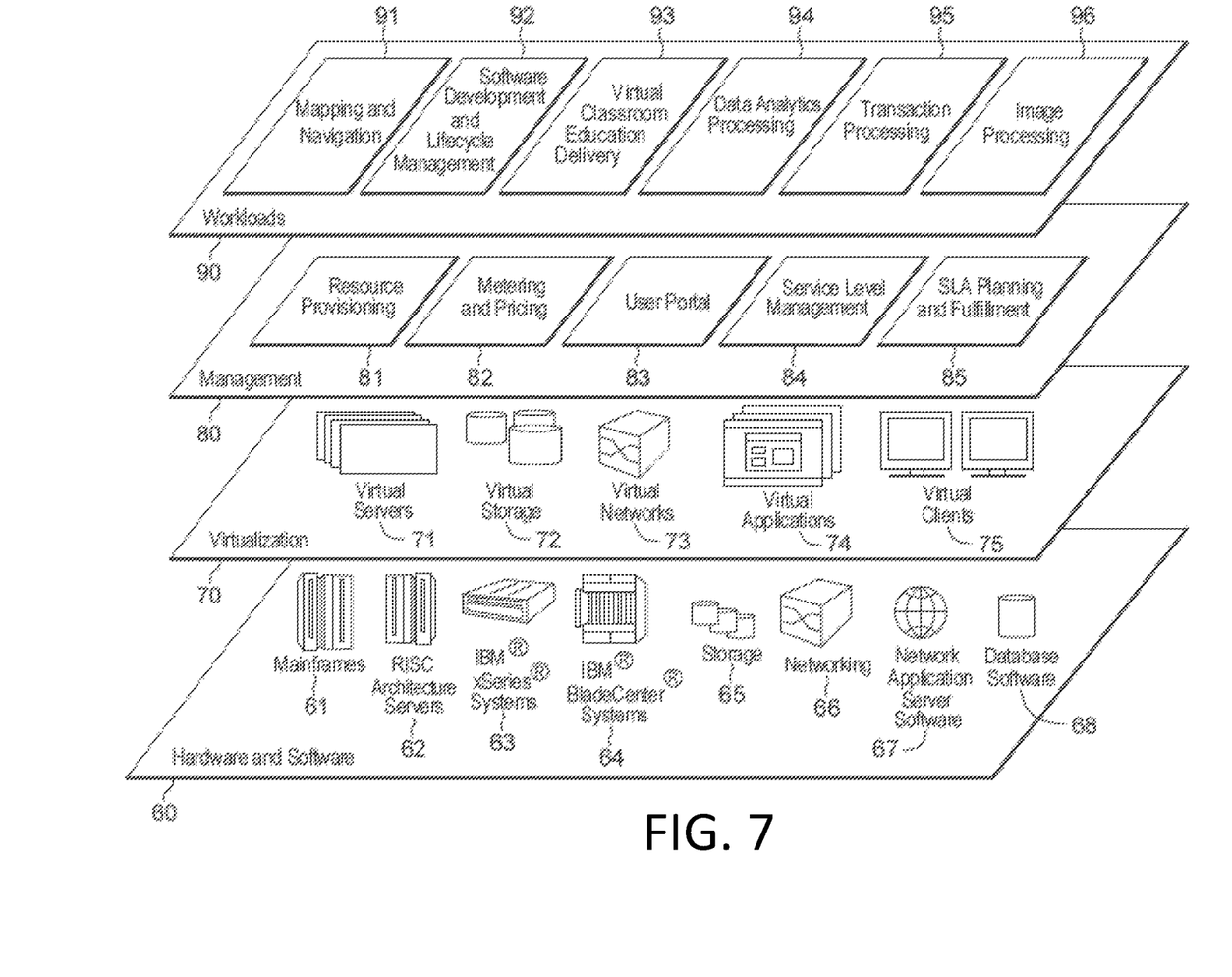
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the essay annotation engine 130 and the automated essay annotation system 120 of FIG. 1, respectively. Program processes 42, as in the essay annotation engine 130 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the automated essay annotation services as provided by the automated essay annotation system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing automated annotation for one or more student works, comprising:
    obtaining, by one or more processors running one or more neural networks, training data for the one or more neural networks including a plurality of sample essays, a plurality of sample annotations respectively corresponding to the plurality of sample essays, and a subject content including respective knowledgebases per topic on which the plurality of sample essays had been written;
    labeling, by the one or more processors running the one or more neural networks, by use of natural language classification tools operatively coupled to the one or more processors, the plurality of sample essays for gradable components and the plurality of sample annotations for each of annotation types;
    building, by the one or more processors running the one or more neural networks, a subject domain comprehension model based on the subject content, by use of the one or more neural networks;
    forming, by the one or more processors running the one or more neural networks, an essay annotation model, based on the gradable components of the plurality of sample essays and the annotation types of the plurality of sample annotations;
    linking, by the one or more processors running the one or more neural networks, nodes of the subject domain comprehension model respectively representing preconfigured essay elements in the plurality of sample essays that show respective writers of the plurality of sample essays understand respective topics of the plurality of sample essays and nodes of the essay annotation model respectively representing preconfigured annotation elements in the plurality of sample annotations that evaluate the plurality of sample essays, based on respective relevancies between the nodes of the subject domain comprehension model and the nodes of the essay annotation model to thereby automatically provide one of the preconfigured annotation elements, represented by a first node of the subject domain comprehension model, for one of the preconfigured essay elements, and a first node amongst the nodes of the essay annotation model based on an edge between the first node of the subject domain comprehension model and the first node of the essay annotation model that is made as a result of the linking; and
    producing, by the one or more processors, interconnected models resulting from the linking based on determining that the one or more neural networks has been trained for automatically annotating the one or more student works, including an essay, which had been submitted for evaluation to a computerized educational tool utilizing the interconnected models according to a standard of review corresponding to a preconfigured group of students who had written the one or more student works.

2. The computer implemented method of claim 1, wherein the annotation types include corrections in texts, corrections in editorial marks, suggestions for activities, references, techniques, and combinations thereof, compliments, and grade letters.

3. The computer implemented method of claim 1, wherein the gradable components for the sample essays include respective structures for each of the sample essays, each paragraph, each sentence, relevant facts, arguments presented in each of teh sample essays, assessments on the arguments on a logical flow, clarity of the arguments, and evidentiary supports for the arguments, evidence against the arguments, persuasiveness in expression for the arguments, clarity in expression for the arguments, general readability, originality, mechanics including grammar, spelling, and word choices.

4. The computer implemented method of claim 1, wherein the subject domain comprehension model corresponds to respective student cohorts, as being classified based on respective academic development levels as represented by school-year grades of students, academic performance levels, and combinations thereof.

5. The computer implemented method of claim 1, further comprising:
    obtaining, from the student, the essay amongst the one or more student works that had been submitted for a review, wherein the student is a member in the preconfigured group of students corresponding to the standard of review;
    annotating the essay by use of the interconnected models from the producing according to the standard of review; and
    presenting the essay with annotations resulting from the annotating to the student and to an instructor, designated to receive the essay.

6. The computer implemented method of claim 5, further comprising
    comparing the annotations in the essay with a preset performance threshold for a quality of the annotations; and
    adjusting automatically the interconnected models from the producing, based on ascertaining that the annotations do not satisfy the preset performance threshold.

7. The computer implemented method of claim 1, further comprising:

obtaining a debate script for review as being generated from a live debate by use of a speech-to-text tool;

annotating the debate script by use of the interconnected models from the producing; and presenting the debate script with annotations in real-time to students participating in the live debate and to an instructor, wherein the debate script is utilized for advancing arguments spontaneously, and for checking facts commented in the debate script.

8. A computer program product comprising:

a computer readable storage medium readable by one or more processor and storing instructions for execution by the one or more processor for performing a method for providing automated annotation for one or more student works, comprising:

obtaining, by one or more processors running one or more neural networks, training data for the one or more neural networks including a plurality of sample essays, a plurality of sample annotations respectively corresponding to the plurality of sample essays, and a subject content including respective knowledge-bases per topic on which the plurality of sample essays had been written;

labeling, by the one or more processors running the one or more neural networks, by use of natural language classification tools operatively coupled to the one or more processor, the plurality of sample essays for gradable components and the plurality of sample annotations for each of annotation types;

building, by the one or more processors running the one or more neural networks, a subject domain comprehension model based on the subject content, by use of the one or more neural networks;

forming, by the one or more processors running the one or more neural networks, an essay annotation model, based on the gradable components of the plurality of sample essays and the annotation types of the plurality of sample annotations;

linking, by the one or more processors running the one or more neural networks, nodes of the subject domain comprehension model respectively representing preconfigured essay elements in the plurality of sample essays that show respective writers of the plurality of sample essays understand respective topics of the plurality of sample essays and nodes of the essay annotation model respectively representing preconfigured annotation elements in the plurality of sample annotations that evaluate the plurality of sample essays, based on respective relevancies between the nodes of the subject domain comprehension model and the nodes of the essay annotation model to thereby automatically provide one of the preconfigured annotation elements, represented by a first node of the subject domain comprehension model, for one of the preconfigured essay elements, and a first node amongst the nodes of the essay annotation model based on an edge between the first node of the subject domain comprehension model and the first node of the essay annotation model that is made as a result of the linking; and     producing interconnected models resulting from the linking based on determining that the one or more neural network has been trained for automatically annotating the one or more student works, including an essay, which had been submitted for evaluation to a computerized educational tool utilizing the interconnected models according to a standard of review corresponding to a preconfigured group of students who had written the one or more student works.

9. The computer program product of claim 8, wherein the annotation types include corrections in texts, corrections in editorial marks, suggestions for activities, references, techniques, and combinations thereof, compliments, and grade letters.

10. The computer program product of claim 8, wherein the gradable components for the sample essays include respective structures for each of the sample essays, each paragraph, each sentence, relevant facts, arguments presented in each of the sample essays, assessments on the arguments on a logical flow, clarity of the arguments, and evidentiary supports for the arguments, evidence against the arguments, persuasiveness in expression for the arguments, clarity in expression for the arguments, general readability, originality, mechanics including grammar, spelling, and word choices.

11. The computer program product of claim 8, wherein the subject domain comprehension model corresponds to respective student cohorts, as being classified based on respective academic development levels as represented by school-year grades of students, academic performance levels, and combinations thereof.

12. The computer program product of claim 8, further comprising:

obtaining, from a student, the essay amongst the one or more student works that had been submitted for a review, wherein the student is a member in the preconfigured group of students corresponding to the standard of review;

annotating the essay by use of the interconnected models from the producing according to the standard of review; and     presenting the essay with annotations resulting from the annotating to the student and to an instructor, designated to receive the essay.

13. The computer program product of claim 12, further comprising comparing the annotations in the essay with a preset performance threshold for a quality of the annotations; and     adjusting automatically the interconnected models from the producing, based on ascertaining that the annotations do not satisfy the preset performance threshold.

14. The computer program product of claim 8, further comprising:

obtaining a debate script for review as being generated from a live debate by use of a speech-to-text tool;

annotating the debate script by use of the interconnected models from the producing; and     presenting the debate script with annotations in real-time to students participating in the live debate and to an instructor, wherein the debate script is utilized for advancing arguments spontaneously, and/or for checking facts commented in the debate script.

15. A system comprising:

a memory;

one or more processors in communication with memory; and program instructions executable by the one or more processors via the memory to perform a method for providing automated annotation for one or more student works, comprising:

obtaining, by the one or more processors running one or more neural networks, training data for the one or more neural networks including a plurality of sample essays, a plurality of sample annotations respectively corresponding to the plurality of sample essays, and a subject content including respective knowledgebases per topic on which the plurality of sample essays had been written;

labeling, by the one or more processors running the one or more neural networks, by use of natural language classification tools operatively coupled to the one or more processor, the plurality of sample essays for gradable components and the plurality of sample annotations for each of annotation types;

building, by the one or more processors running the one or more neural networks, a subject domain comprehension model based on the subject content, by use of the one or more neural networks;

forming, by the one or more processors running the one or more neural networks, an essay annotation model, based on the gradable components of the plurality of sample essays and the annotation types of the plurality of sample annotations;

linking, by the one or more processors running the one or more neural networks, nodes of the subject domain comprehension model respectively representing preconfigured essay elements in the plurality of sample essays that show respective writers of the plurality of sample essays understand respective topics of the plurality of sample essays and nodes of the essay annotation model respectively representing preconfigured annotation elements in the plurality of sample annotations that evaluate the plurality of sample essays, based on respective relevancies between the nodes of the subject domain comprehension model and the nodes of the essay annotation model to thereby automatically provide one of the preconfigured annotation elements, represented by a first node of the subject domain comprehension model, for one of the preconfigured essay elements, and a first node amongst the nodes of the essay annotation model based on an edge between the first node of the subject domain comprehension model and the first node of the essay annotation model that is made as a result of the linking; and producing interconnected models resulting from the linking based on determining that the one or more neural network has been trained for automatically annotating the one or more student works, including an essay, which had been submitted for evaluation to a computerized educational tool utilizing the interconnected models according to a standard of review corresponding to a preconfigured group of students who had written the one or more student works.

16. The system of claim 15, wherein the annotation types include corrections in texts, corrections in editorial marks, suggestions for activities, references, techniques, and combinations thereof, compliments, and grade letters, and
wherein the gradable components for the sample essays include respective structures for each of the sample essays, each paragraph, each sentence, relevant facts, arguments presented in each of the sample essays, assessments on the arguments on a logical flow, clarity of the arguments, and evidentiary supports for the arguments, evidence against the arguments, persuasiveness in expression for the arguments, clarity in expression for the arguments, general readability, originality, mechanics including grammar, spelling, and word choices.

17. The system of claim 15, wherein the subject domain comprehension model corresponds to respective student cohorts, as being classified based on respective academic development levels as represented by school-year grades of students, academic performance levels, and combinations thereof.

18. The system of claim 15, further comprising:
obtaining a debate script for review as being generated from a live debate by use of a speech-to-text tool;
annotating the debate script by use of the interconnected models from the producing; and
presenting the debate script with annotations in real-time to students participating in the live debate and to an instructor, wherein the debate script is utilized for advancing arguments spontaneously, and/or for checking facts commented in the debate script.

19. The system of claim 15, further comprising:
obtaining, from a student, the essay amongst the one or more student works that had been submitted for a review, wherein the student is a member in the preconfigured group of students corresponding to the standard of review;
annotating the essay by use of the interconnected models from the producing according to the standard of review; and
presenting the essay with annotations resulting from the annotating to the student and to an instructor, designated to receive the essay.

20. The system of claim 19, further comprising
comparing the annotations in the essay with a preset performance threshold for a quality of the annotations; and
adjusting automatically the interconnected models from the producing, based on ascertaining that the annotations do not satisfy the preset performance threshold.

* * * * *